US006673853B2

(12) United States Patent
Muramoto et al.

(10) Patent No.: US 6,673,853 B2
(45) Date of Patent: Jan. 6, 2004

(54) ELECTRODEPOSITION COATING COMPOSITION

(75) Inventors: Hisaichi Muramoto, Kobe (JP); Kouichi Ohara, Shijonawate (JP)

(73) Assignee: Nippon Paint Co., Ltd., Osaka (JP)

( * ) Notice: Subject to any disclaimer, the term of this patent is extended or adjusted under 35 U.S.C. 154(b) by 169 days.

(21) Appl. No.: 09/983,782

(22) Filed: Oct. 25, 2001

(65) Prior Publication Data

US 2002/0074228 A1 Jun. 20, 2002

(30) Foreign Application Priority Data

Oct. 26, 2000 (JP) ........................................ 2000-326498

(51) Int. Cl.[7] .............................................. C25D 13/06
(52) U.S. Cl. ........................ 523/415; 523/404; 525/113; 204/489
(58) Field of Search ................................. 523/415, 404; 525/113; 204/489

(56) References Cited

U.S. PATENT DOCUMENTS 4,916,019 A * 4/1990 Nakatani et al. ......... 204/181.7
5,177,125 A * 1/1993 Schwerzel et al. ....... 204/181.7

* cited by examiner

*Primary Examiner*—Kishor Mayekar
(74) *Attorney, Agent, or Firm*—Sughrue Mion, PLLC

(57) ABSTRACT

The present invention provides an electrodeposition coating composition excellent in storage stability and capable of forming a novel multilayer structure comprising a particle A containing a resin (a) whose solubility parameter is $\delta a$, and a particle B containing a curing agent and a resin (b) whose solubility parameter is $\delta b$, wherein the value of ($\delta b-\delta a$) is not less than 1.0.

5 Claims, No Drawings

ELECTRODEPOSITION COATING COMPOSITION

TECHNICAL FIELD

The present invention relates to a novel electrodeposition coating composition useful in the coating industry, in particular in the field of automobile coatings. More particularly, it relates to an electrodeposition coating composition capable of forming electrodeposited coating films having a multilayer structure comprising an anticorrosive layer and a shock-absorbing layer.

BACKGROUND ART

In recent years it has been urgently demanded that the coating process be curtailed in the field of coatings, in particular in the field of automobile coatings, so that the problems of saving resources, reducing costs and minimizing environmental impacts (VOC and HAPs, etc.) may be solved. In the conventional procedure for finishing coating automobiles, the three-coat three-bake coating technique has been used, namely the electrodeposited coating film, intermediate coating film and top coating film are baked each time after application of each corresponding coating. In recent years, however, it has been demanded that the coating film comparable in appearance, corrosion resistance and shock resistance (chipping resistance) to those which can be exhibited by the three-coat films obtained by the conventional three-coat three-bake coating technique be acquired by employing the three-wet coating system according to which the three coating steps, namely intermediate coating, base coating and clear coating, are carried out in the wet-on-wet manner following the step of electrodeposition coating and baking of the electrodeposited coating film and the resulting wet coating films are baked simultaneously, while thereby reducing the number of baking process steps.

The above-mentioned shock resistance, in particular the so-called chipping resistance to collision of pebbles or like obstacles with the car body during running, can be secured by the conventional three-coat three-bake coating technique, for example by providing a particular intermediate coating film having chipping resistance. In the three-wet coating system mentioned above, however, the conventional intermediate coatings cannot be used since the coating films obtained tend to be impaired in appearance due to such troubles as blurring or layer inversion. The coating films obtained by the three-wet coating system are disadvantageous in that they are low in shock resistance and chipping resistance.

Japanese Kokai Publication Sho-62-65765 discloses a technique according to which a resin layer capable of absorbing a shock to coating films (the so-called anti-chipping primer layer) is provided during multilayer film formation, in particular between the electrodeposited coating film and intermediate coating film. However, further incorporation of such a step in the car body coating process is against the market needs for curtailment of the above process and for cost saving.

While, generally, the intermediate coating film in the multilayer coating film formed on a car body or the like plays a role in building up the above-mentioned chipping resistance, there are technologies of providing the electrodeposited coating film with chipping resistance.

In Japanese Kokoku Publication Sho-56-41670, Japanese Kohyo Publication Hei-03-504396 and Japanese Kokai Publication Hei-07-82340, there are disclosed electrodeposition coating compositions in which an amine-modified epoxy-based cationic resin and an elastomer component having a shock absorbing capacity are integrated as a resin composition by reacting them each other in advance for the purpose of improving the shock absorbing property of the binder as a whole. Since, however, an amine-modified epoxy resin and an elastomer (rubber) component, which are intrinsically incompatible with each other, are reacted each other for integration on the molecular level for use in those resin compositions for electrodeposition coatings, the corrosion resistance decreases contrariwise when the amount of the elastomer component submitted to reaction is increased to an extent sufficient to provide a satisfactory level of shock resistance (chipping resistance), although the storage stability of the coatings is high. It is thus difficult for such compositions to perform the functions satisfactorily in the above-mentioned three-wet coating.

In Japanese Kokai Publication Hei-05-230402, Japanese Kokai Publication Hei-07-207196 and Japanese Kokai Publication Hei-09-208865, there are disclosed electrodeposition coating compositions characterized in that a hydrophilic (polar) or reactive functional group is introduced into the elastomer (rubber) component to thereby improve the compatibility thereof with the amine-modified epoxy-based cationic resin and thus secure the storage stability of the coatings. In these resin compositions for electrodeposition coatings, the elastomer (rubber) component is designed independently of the amine-modified epoxy-based cationic resin, namely the main binder in the electrodeposition coatings, so that when the proportion of the elastomer component is increased to an extent sufficient to provide a satisfactory level of shock resistance (chipping resistance), the corrosion resistance decreases contrariwise, like the case mentioned above. It is thus difficult for such compositions to perform the functions satisfactorily in the above-mentioned three-wet coating. Furthermore, the polar functional group introduction into the elastomer (rubber) component results in an unnecessary increase in resin glass transition temperature, producing such problems as a decrease in elasticity modulus and a decrease in shock resistance (chipping resistance).

Furthermore, the above-mentioned technologies each intends to form electrodeposited coating films having a single-layer structure while securing the compatibility between the elastomer (rubber) component, which is to provide the electrodeposited coating films with shock resistance, and the amine-modified epoxy-based cationic resin, which is to provide corrosion resistance. In that case, the shock resistance (chipping resistance) and corrosion resistance are attainable simultaneously only at an unsatisfactory level, although the storage stability of the coatings is high.

Accordingly, it is an object of the present invention to provide an electrodeposition coating composition excellent in storage stability and capable of forming a novel multilayer structure and thus useful in the three-wet one-bake coating technique which is intended for coating process curtailment, cost reduction and environmental impact reduction and by which coating films not only comparable in appearance, solvent resistance and corrosion resistance to the conventional three-coat films but also excellent in shock resistance (chipping resistance) can be formed.

SUMMARY OF THE INVENTION

The present invention provides an electrodeposition coating composition comprising a particle A containing a resin (a) whose solubility parameter is δa as well as a particle B containing a curing agent and a resin (b) whose solubility parameter is δb, wherein (1) the value of (δb-δa) is not less than 1.0, (2) as regards the electrodeposited coating film formed from said electrodeposition coating composition, the resin film formed from said particle A shows a dynamic glass transition temperature of −110 to 10° C. and the resin film obtained by film formation from said particle A alone shows an elongation percentage of not less than 200% and (3) as regards the electrodeposited coating film formed from said electrodeposition coating composition, the resin film formed from said particle B shows a dynamic glass transition temperature of 60 to 150° C.

In the following, the present invention is described in further detail.

DETAILED DESCRIPTION OF THE INVENTION

The electrodeposition coating composition according to the present invention, in which two resin components incompatible with each other are used, can form an electrodeposited coating film having a multilayer structure so that a resin layer having corrosion resistance may be formed on the side in contact with the substrate and a resin layer having shock resistance (chipping resistance) on the side in contact with air to thereby attain high levels of corrosion resistance and shock resistance simultaneously.

The electrodeposition coating composition of the invention contains a particle A containing a resin (a) whose solubility parameter is δa as well as a particle B containing a curing agent and a resin (b) whose solubility parameter is δb. In the present specification, it is meant that particles A and particles B are prepared in the form of separate emulsions and are mixed up in preparing the electrodeposition coating composition but occur as separate particles in the coating without being fused together.

In accordance with the present invention, the difference (δb-δa) between the solubility parameter δa of the above resin (a) and the solubility parameter δb of the above resin (b) is not less than 1.0. By selecting two incompatible or hardly compatible resin components such that said value of (δb-δa) is not less than 1.0, it becomes possible to form electrodeposited coating films having a multilayer structure.

It is generally considered that when the difference in solubility parameter between resins is 0.5 or more, the compatibility between them is lost and the coating films show a structure reflecting phase separation. In accordance with the present invention, however, it is necessary that a coating film structure showing distinct layer separation be formed and, therefore, it is necessary that the difference in solubility parameter be at least 1.0 or more. If the difference is less than 1.0, any coating film structure showing distinct layer separation will not be formed in the step of electrodeposition coating, hence the levels of shock resistance, in particular chipping resistance, and corrosion resistance which are attainable simultaneously will be unsatisfactory.

The above-mentioned solubility parameter δ is generally called SP (solubility parameter) and is an index of the hydrophilicity or hydrophobicity of a resin and serves as an important index in estimating the compatibility between resins. The above solubility parameter can be expressed numerically based on the hitherto-known technique of turbidimetry measurement by skilled in the art (K. W. Suh, D. H. Clarke, J. Polymer. Sci., A-1, 5, 1671 (1967)).

Among the above resins a and b, the one having a higher solubility parameter, namely resin (b), is higher in affinity for the electroconductive substrate surface such as a metal, which is higher in surface polarity, so that the electrodeposited coating film formed from particles B containing resin (b) is formed on the side contacting the conductive substrate made of a metal or like material in the step of curing by heating. On the other hand, the particles A containing resin (a) migrate toward the air-contacting side to form another resin layer. Thus, the difference in solubility parameter between the two resins is considered to serve as a driving force for causing resin layer separation.

The state of the above resin layer separation can be confirmed by visual observation of a section of the electrodeposited coating film by means of a video microscope or observation under a scanning electron microscope (SEM observation). For identifying the resin components constituting the respective resin layers, a total reflection Fourier transform infrared photometer (FTIR-ATR), for instance, can be used.

In accordance with the present invention, among the electrodeposited coating film formed from the above electrodeposition coating composition, the resin layer formed from the above particles A containing resin (a) shows a dynamic glass transition temperature of −110 to 10° C. If it is above 10° C., the coating film obtained from particles A will be poor in flexibility or shock resistance. If it is below −110° C., it is difficult in practice to prepare. Preferred is −100 to −30° C.

The above-mentioned dynamic glass transition temperature can be measured by using a dynamic viscoelasticity measuring apparatus such as Rheovibron (product of Orientec) or a Rheometrics dynamic analyzer (product of Rheometrics) following electrodeposition coating of a substrate with the above electrodeposition coating composition of the present invention, curing and peeling of the electrodeposited coating film using mercury.

As regards the particles A containing resin (a) mentioned above, the coating film obtained by film formation from the particles A alone shows an elongation percentage of not less than 200%. When it is less than 200%, the coating films obtained become poor in elasticity. Preferably, it is not less than 500%. The above elongation percentage can be determined according to JIS K 6301.

The above resin (a) is not particularly restricted on condition that the above characteristics requirements are satisfied. Thus, it includes, for example, homopolymers of a conjugated diene monomer such as butadiene, isoprene or chloroprene, or random or block copolymers of a conjugated diene monomer and such a monomer as ethylene, propylene, ethylidene, norbornene, dicyclopentadiene, 1,4-hexadiene, vinyl acetate, vinyl chloride, styrene, acrylonitrile, isobutylene or (meth) acrylic acid (ester); polyurethane-based thermoplastic elastomers synthesized by polyaddition reaction of a diisocyanate and a diol; polyester-based thermoplastic elastomers synthesized by transesterification and polycondensation reactions using dimethyl terephthalate, 1,4-butanediol, poly(tetramethylene) glycol, etc. as raw materials; and polyamide-based thermoplastic elastomers synthesized by transesterification and polycondensation reactions using a lactam, a dicarboxylic acid and polyether diol as raw materials.

In the practice of the invention, the above resin (a) is preferably an elastomer (rubber) produced by polymerizing a monomer component comprising at least 50% by weight of a conjugated diene monomer in view of the possible shock resistance manifestation level, economy (cost) and general versatility. If the diene content is less than 50% by weight, it will become difficult to constitute a resin layer showing the above glass transition temperature and elongation percentage in the step of coating film formation and, as a result, the shock resistance and chipping resistance will decrease. An elastomer produced by polymerizing a monomer component comprising not less than 60% by weight of a conjugated diene monomer is more preferred and not less than 65% by weight is still more preferred.

The molecule of the above resin (a) may contain, within the molecular structure and/or at a terminus thereof, a reactive group or polar group such as a hydroxyl, amino, vinyl, carboxyl, urethane or urea group. The above reactive group or polar group can be introduced by copolymerizing a monomer component comprising a reactive or polar group-containing monomer in the step of preparing a resin (a) or by a method known in the art into a resin (a) obtained by copolymerization.

When the above resin (a) is an oligomer (liquid rubber) having a number average molecular weight less than 10,000, the resin is highly sticky and, as such, has low shock resistance performance characteristics, so that it is necessary to subject the same to curing reaction in the step of coating film formation in order to express the desired coating film performance characteristics, such as shock resistance. In that case, it is preferred that hydroxyl groups are contained so as to give a hydroxyl value within the range of 20 to 200. At a hydroxyl value less than 20, the coating film may fail to be cured to a sufficient extent, hence fail to express satisfactory rubber performance characteristics such as sufficient elongation percentage. If it is above 200, excess hydroxyl groups remain in the coating film after curing, hence the water resistance may decrease. Furthermore, the hardness of the cured coating film increases, leading to failure to express a sufficient level of elongation percentage.

When the above resin (a) has a high number average molecular weight not less than 10,000, if it has little stickiness without curing and shows sufficient shock resistance performance characteristics, a curing reaction is not particularly required in the step of coating film formation. In such cases, it is not necessary to provide the resin structure with reactive groups or polar groups in advance.

The molecular weight of the above resin (a) is not particularly restricted but preferably is within the range of 1,000 to 200,000 in terms of number average molecular weight. If it is less than 1,000, it will be difficult to obtain coating films showing an elongation percentage exceeding 200% even when the crosslinking reaction is effectively carried out in the step of coating film formation. If it exceeds 200,000, the resin solution will become highly viscous so that not only the handling of the obtained resin in such operations as emulsification/dispersion becomes difficult but also the film appearance of the electrodeposited coating films obtained may be markedly impaired. Further, in some instances, it becomes difficult, due to the high viscosity, to secure the layer separation in the step of baking of coating films.

The above resin (a), when emulsified and dispersed, independently of the resin (b), in an aqueous medium, constitutes the particles A.

The above resin (a) may introduce a cationic group such as an amino group among the above-mentioned reactive or polar groups by a urethane-forming reaction or the like to use the resulting products as they are or self-emulsifiable and dispersible in an aqueous medium by using a neutralizing agent. Or, it is also possible to emulsify and disperse it in an aqueous medium by separately applying a cationic emulsifier. On that occasion, if necessary, an appropriate amount of a curing agent, for instance, maybe added to the resin and emulsified/dispersed together. As the above neutralizing agent, there may be mentioned inorganic acids such as hydrochloric acid, nitric acid and phosphoric acid; and organic acids such as formic acid, acetic acid, lactic acid, sulfamic acid and acetylglycine acid.

In the practice of the present invention, the resin (a) is preferably emulsified/dispersed in an aqueous medium using a cationic emulsifier, since the hydrophobicity of the particles A containing resin (a) as a whole then increases and a multilayer structure with a distinct layer separation can be obtained.

The above cationic emulsifier is not particularly restricted but may be any one having a cationic group. Preferably, it has a number average molecular weight of 1,000 to 200,000. If it is less than 1,000, the water resistance of coating films may be adversely affected. If it exceeds 200,000, the system will become highly viscous in the step of baking of coating films, so that the layer separation may possibly be inhibited.

For securing the emulsifiability/dispersibility of the above resin (a), the cationic group content of the above cationic emulsifier, namely the content of the amino group, ammonium salt group or sulfonium salt group in the emulsifier, is preferably about 30 to 150 as expressed in terms of amine value equivalent. If it is less than 30, the effect of emulsifying/dispersing the resin (a) will be poor. If it exceeds 150, the water resistance and other properties of coating films may be adversely affected.

The above cationic emulsifier is incorporated preferably in an amount within the range of 10 to 50% by weight on the solid basis relative to 100 parts by weight of the resin (a) on the solid basis. If the amount is less than 10% by weight, the dispersion stability of the emulsion will become poor and, if it exceeds 50% by weight, not only the water resistance of coating films will deteriorate but also it will become difficult for such characteristic features owing to resin (a) as shock resistance to be fully expressed.

The above cationic emulsifier can be prepared by providing the main chain of a resin with a cationic group by carrying out an appropriate reaction by a method known in the art. The resin skeleton of the above cationic emulsifier is not particularly restricted but may be an acrylic resin, epoxy resin, liquid rubber (elastomer), polyurethane or polyether, or a modified resin based thereon, for instance.

Those having the above-mentioned acrylic resin as the resin skeleton can be synthesized, for example, by subjecting an acrylic copolymer containing a plurality of epoxy groups within the molecule and an amine to ring opening addition reaction. Thus, a cationic acrylic resin can be obtained by copolymerizing an epoxy group-containing acrylic monomer such as glycidyl (meth) acrylate with another monomer and subjecting all the epoxy groups of the resulting epoxy group-containing acrylic resin to ring opening by reacting with an amine.

The above amine is not particularly restricted but mention may be made of, for example, primary, secondary and tertiary amine acid salts such as butylamine, octylamine, diethylamine, dibutylamine, methylbutylamine, monoethanolamine, diethanolamine, N-methylethanolamine, triethylamine acid salts and N,N-dimethylethanolamine acid salts. Ketimine-blocked primary amino group-containing secondary amines, such as aminoethylethanolamine methyl isobutyl ketimine, may also be used. For causing all epoxy rings to open, it is necessary that these amines be reacted with the epoxy rings at least in an equivalent amount.

The above cationic acrylic resin can also be obtained by a direct synthetic method comprising copolymerizing an amino group-containing acrylic monomer with another monomer. The above amino group-containing acrylic monomer includes N,N-dimethylaminoethyl(meth)acrylate and N,N-di-tert-butylaminoethyl(meth)acrylate, etc.

The other monomer to be copolymerized with the above epoxy group-containing acrylic monomer or amino group-containing acrylic monomer is not particularly restricted but includes, for example, hydroxyl group-containing acrylic monomers, other acrylic monomers and non-acrylic monomers. The hydroxyl group-containing acrylic monomers mentioned above can serve to increase the reactivity in curing, hence are preferably used.

When the resin skeleton is the above-mentioned epoxy resin, a cationic group can be introduced therein by modifying the epoxy groups in the resin in the same manner as mentioned above.

When the resin skeleton is the above-mentioned liquid rubber (elastomer), polyurethane or polyether, a cationic group can be introduced therein by subjecting hydroxyl, carboxyl, epoxy or like groups occurring at the molecular terminus and/or in the middle of the molecular structure to urethane forming reaction or addition reaction of an amine.

The cationic emulsifier mentioned above may have a primary hydroxyl group introduced therein for providing the reactivity in curing or a long-chain alkyl group, such as stearyl, dodecyl or octyl group, introduced therein for improving the ability to be adsorbed on the above resin (a). These can be introduced by reacting functional groups in the main chain with a hydroxyl group-containing secondary amine or a long-chain alkyl group-containing secondary amine, or by copolymerization using a monomer having such a group.

In the above cationic emulsifier, the above cationic group plays a role as a hydrophilic group. Furthermore, the mutual adsorption with the above resin (a) can be secured by means of the flexible main chain moiety and hydrophobic moieties such as alkyl groups and benzene structures occurring in the cationic emulsifier. The above cationic emulsifier can be dissolved or dispersed as such in an aqueous medium.

The above-mentioned particles A may contain a curing agent.

The above curing agent includes isocyanate curing agents, melamine curing agents and amide curing agents. Preferred are blocked polyisocyanates.

As examples of the polyisocyanates serving as raw materials for the above blocked polyisocyanates, there may be mentioned aliphatic diisocyanates such as hexamethylene diisocyanate, tetramethylene diisocyanate and trimethylhexamethylene diisocyanate; alicyclic polyisocyanates such as isophorone-diisocyanate and 4,4'-methylenebis(cyclohexyl isocyanate); aromatic diisocyanates such as 4,4'-diphenylmethanediisocyanate, tolylene diisocyanate and xylylene diisocyanate, and polymers derived from these. The above-mentioned blocked polyisocyanates can be obtained by blocking these with an appropriate blocking agent.

Examples of the blocking agent are monohydric alkyl (or aromatic) alcohols such as n-butanol, n-hexyl alcohol, 2-ethylhexanol, lauryl alcohol, phenolcarbinol and methylphenylcarbinol; cellosolves such as ethylene glycol mono-hexyl ether and ethylene glycol mono-2-ethylhexyl ether; phenols such as phenol, p-tert-butylphenol and cresol; oximes such as dimethyl ketoxime, methyl ethyl ketoxime, methyl isobutyl ketoxime, methyl amyl ketomixe and cyclohexanone oxime; and lactams such as $\epsilon$-caprolactam and $\gamma$-butyrolactam. Oximes and lactams are preferred from the viewpoint of resin curability since these dissociate at low temperature.

The percentage of blocking with the above blocking agent is preferably 100% so that the storage stability of the coating can be secured.

The above polyisocyanates and blocking agents may respectively be used singly or two or more may be used in combination. A plurality of the resulting blocked polyisocyanates may also be used in combination for the purpose of adjusting the coating film physical properties or the degree of curing.

When it is necessary, in the practice of the present invention, to cure the resin layer composed of the particles A containing resin (a), it is preferred that a solubility parameter ($\delta i$) of at least one curing agent such as mentioned above has a value between the solubility parameter $\delta a$ of resin (a) and the solubility parameter $\delta b$ of resin (b), namely satisfies the relation $\delta a < \delta i < \delta b$. This makes it possible for the blocked polyisocyanate to be distributed and dissolved in the respective layers after separation into two layers, whereby the curability of the layer containing resin (a) can be secured and the simultaneous curing of the layer containing resin (b) can be realized, with the result that the interlayer adhesion in the multilayer film can be improved and the multilayer appearance after top coating can further be improved.

Further, as means for promoting distribution and dissolution the blocked polyisocyanate in the resin layer comprising the particles A containing the above resin (a), it is also possible to devise that a blocked polyisocyanate partly having an unblocked isocyanato group be reacted with the hydroxyl group which the above resin (a) contains in advance so that the resin (a) and curing agent can migrate together on the occasion of interlayer separation involving simultaneous curing of the layer containing resin (a) and the layer containing resin (b).

The mixing ratio of the above blocked polyisocyanate to the resin (a) may vary according to the degree of crosslinking required for the intended use of the cured coating films, for instance, but, in view of the physical properties of coating films and the applicability of the top coating, it is preferably within the range of 10 to 50% by weight, on the solid basis, relative to 100 parts by weight of the resin (a) on the solid basis. An amount less than 10% by weight will lead to insufficient curing of coating films, hence decreased physical properties of coating films, such as decreased mechanical strength thereof and, in some instances, to a bad appearance resulting from coating film erosion by the thinner of the coating in the step of top coating. An amount exceeding 50% by weight may conversely cause excessive curing, resulting in poor physical properties of coating films, such as poor shock resistance.

In accordance with the present invention, the resin layer formed from the particles B containing resin (b) among the electrodeposited coating film formed from the electrodeposition coating composition has a dynamic glass transition temperature of 60 to 150° C. When it is lower than 60° C., the difference in solubility parameter from that ($\delta a$) of resin (a) cannot be made not less than 1.0 but the coating film obtained will be poor in corrosion resistance. If it is above 150° C., the coating film obtained will be too hard, allowing cracking in some instances. It is preferably 80 to 140° C. The above dynamic glass transition temperature can be determined according to the method mentioned above.

From the viewpoint of expression of good rust prevention on electroconductive substrates, it is preferred that the above resin (b) be a cation-modified epoxy resin.

The cation-modified epoxy resin can be produced by reacting, for ring opening, the epoxy ring in a starting material resin molecule with an amine such as a primary amine, secondary amine or tertiary amine acid salt. The above starting material resin is preferably a polyphenol polyglycidyl ether type epoxy resin which is the product resulting from the reaction of a polycyclic phenol compound, such as bisphenol A, bisphenol F, bisphenol S, phenol novolak or cresol novolak, with epichlorohydrin. As examples for other starting material resins, there may be mentioned those oxazolidone ring-containing epoxy resins which are described in Japanese Kokai Publication Hei-05-306327. These epoxy resins are obtained by reacting, with epichlorohydrin, a diisocyanate compound or a bisurethane compound obtained by blocking the NCO groups of a diisocyanate compound with a lower alcohol such as methanol or ethanol.

The above starting material resin can be used after chain extension, prior to epoxy ring opening reaction with an amine, by means of a bifunctional polyester polyol, polyether polyol, a bisphenol, a dibasic carboxylic acid or the like. Similarly, prior to epoxy ring opening with an amine, a monohydroxy compound, such as 2-ethylhexanol, nonylphenol, ethylene glycol mono-2-ethylhexyl ether or propylene glycol mono-2-ethylhexyl ether, may be added partially to the epoxy ring for the purpose of adjusting the molecular weight or amine equivalent or improving the thermal flow characteristics.

As the above amine, there may be mentioned those specifically mentioned hereinabove referring to the cationic emulsifier.

As for the method of introducing a cationic group into the above epoxy resin, the production method described in Japanese Kokai Publication Hei-11-209663 which comprises modifying the epoxy ring into a sulfonium salt is preferred.

The above cation-modified epoxy resin preferably has a number average molecular weight in the range of 1,500 to 5,000. If it is less than 1,500, physical properties such as the solvent resistance and corrosion resistance of cured coating films may be poor. If it exceeds 5,000, it will become difficult to control the resin solution viscosity, hence to synthesize the resin, and the viscosity of the product resin will become high, hence difficult to handle in the step of emulsification/dispersion. Furthermore, in some instances, the flow characteristics will be poor in the step of heating/curing and the coating film appearance may be markedly impaired.

The molecule of the above resin (b) is preferably designed such that the hydroxyl value thereof falls within the range of 50 to 250. If the hydroxyl value is less than 50, the curing of coating films will become insufficient and, if, conversely, it exceeds 250, excess hydroxyl groups will remain in the coating film after curing, whereby the water resistance may decrease.

The particles B containing resin (b) mentioned above contain a curing agent. The above curing agent is not particularly restricted in kind on condition that the resin component can be cured therewith upon heating and it includes those specifically mentioned hereinabove. Among them, mention may be made of blocked polyisocyanates, which are suited for use as curing agents for electrodeposited resins. The level of addition of the above curing agent is the same as mentioned hereinabove.

The above resin (b), together with the above curing agent, is emulsified/dispersed as such in water to give an emulsion, or emulsified/dispersed in water to give a cationized emulsion by treatment for neutralization using a sufficient amount of a neutralizing agent to neutralize the amino groups occurring in each resin. In the step of emulsion preparation, it is also possible to use the cationic emulsifier specifically mentioned hereinabove.

The above method of emulsification/dispersion maybe the same as mentioned hereinabove.

The electrodeposition coating composition of the present invention can be prepared by mixing up the particles A and particles B obtained in the above manner.

The mixing ratio between the above resin (a) constituting particles A and the above resin (b) constituting particles B is preferably 5/95 to 70/30 by weight on the solid basis. If it is outside the above range, the cured coating film obtained after electrodeposition coating and baking may not have a multilayer structure; the resin used in a higher proportion may form a continuous phase while the resin used in a lower proportion may build up a dispersed phase-forming island structure (or microdomain structure). Even if a multilayer structure is formed, any one of the layers of the multilayer structure will have an extremely diminished thickness, so that any of the shock resistance (chipping resistance) and corrosion resistance will become very poor, hence it is not preferable. A more preferred range is within 10/90 to 60/40.

The resin layer formed from the above particles A preferably has a dry film thickness of 1 to 20 $\mu$m. If it is less than 1 $\mu$m, the coating film obtained cannot be expected to be satisfactory in shock absorbing capacity. If it exceeds 20 $\mu$m, the surface roughness will increase, hence the coating film appearance is impaired. More preferred is 3 to 15 $\mu$m.

For securing those rust prevention, coating film appearance and hiding power required of the conventional electrodeposited coating films, the resin layer formed by the above particles B preferably has a dry film thickness of 5 to 40 $\mu$m. If it is less than 5 $\mu$m, the corrosion resistance of coating films will be insufficient. If it exceeds 40 $\mu$m, the surface roughness will increase and thus the coating film appearance will be impaired, and the occurrence of coating film defects such as foaming will become remarkable. More preferred is 10 to 30 $\mu$m.

The above electrodeposition coating composition of the present invention generally contains a pigment.

The above pigment is not particularly restricted but may be any of those generally used in coatings. Thus, it includes, for example, color pigments such as carbon black, titanium dioxide and graphite; extender pigments such as kaolin, aluminum silicate (clay) and talc; and rust preventive pigments such as aluminum phosphomolybdate, lead silicate, lead sulfate, zinc chromate and strontium chromate. Particularly important among them as pigments to be contained in the cured multilayer film after electrodeposition coating are carbon black, titanium dioxide, aluminum silicate (clay) and aluminum phosphomolybdate. Titanium dioxide mentioned above is high in hiding power as a color pigment and inexpensive and therefore most suited for use in electrodeposited coating films. The above pigments may be used singly but, generally, a plurality thereof are used according to the intended purpose.

The above pigments can be incorporated in the above electrodeposition coating composition of the invention in appropriate amounts after preliminary preparation of a pigment dispersion paste by dispersing them in a cationic pigment-dispersing resin in general use.

As for the level of addition of the above pigments, the ratio P/V between the whole pigment weight (P) and the weight of all vehicle components other than the pigments (V) in the electrodeposition coating composition is preferably within the range of 1/10 to 1/3. The term "all vehicle components other than the pigments" mentioned above means the whole solid components other than the pigments constituting the coating. When the ratio is less than 1/10, the barrier properties of coating films against corrosive factors such as moisture may decrease excessively due to an insufficient pigment content and, as a result, any practical level of corrosion resistance may not be expressed. If it exceeds 1/3, a viscosity increase is caused in the step of curing due to the excessive pigment content, the flow characteristics thus may deteriorate and the coating film appearance may be markedly impaired.

In the electrodeposition coating composition of the present invention, there may be incorporated such additives as a rust inhibitor and a surfactant (antifoaming agent) each in an appropriate amount. As the above rust inhibitor which are soluble in water and easy to use, there may be mentioned, in view of the recent market trend toward exclusion of hazardous heavy metals such as lead, those organic acid salts of zinc, cerium, neodymium, praseodymium and like rare earth metals. For example, zinc acetate, cerium acetate, neodymium acetate and the like can be incorporated in the above particles B in the step of preparation thereof and added to the coating in an appropriate amount in a form included or adsorbed in the resin emulsion.

The electrodeposition coating composition of the present invention is preferably prepared so that the solid concentration is amount to in the range of 15 to 25% by weight. In adjusting the solid concentration, an aqueous medium, for example water alone or a mixture of water and a hydrophilic organic solvent, is used. A small amount of an additive may be incorporated in the electrodeposition coating composition. As the additives, there may be mentioned, for example, ultraviolet absorbers, antioxidants, surfactants, coating film surface smoothening agents and curing catalysts such as organotin compounds.

The electrodeposition coating composition of the present invention can be used in electrodeposition coating, which is followed by baking, by those methods known in the art. Heating for the purpose of baking allows the resins a and b contained in the electrodeposition coating composition of the invention to be respectively oriented according to the solubility parameter intrinsic to each resin and, at the final stage of baking to give a cured coating film, an electrodeposited and cured film having a multilayer structure can be obtained in which structure the resin (a) occurs on the side in direct contact with air and the resin (b) occurs on the side in direct contact with the electroconductive substrate. Furthermore, in carrying out the above baking, it is preferable, for improving the coating film appearance and promote the layer separation, to select a temperature at which layer separation can occur within the electrodeposited film but which is lower than the temperature necessary for coating film curing and carry out preheating at that temperature and then heating followed by curing the coating film. The above preheating is preferably carried out at a temperature generally within the range of 60 to 130° C.

In the practice of the present invention, the resin (a) and resin (b) each occurs in an independently emulsified/dispersed state, so that the stability of the coating can be secured without any need for giving consideration to the compatibility between resin (a) and resin (b). If a polar functional group, for example an epoxy group, is introduced into the resin (a) to secure the compatibility between resin components, as described in Japanese Kokai Publication Hei-05-230402, Japanese Kokai Publication Hei-07-207196 and Japanese Kokai Publication Hei-09-208865, there will arise the problem that the elongation percentage and elasticity percentage of the coating films obtained decrease. On the contrary, in the practice of the present invention, no such modification is required and the electrodeposited coating films can be provided with a high level of shock-absorbing performance characteristics.

The electrodeposition coating composition of the present invention constitutes a multilayer coating film and thus function division is realized, so that an electrodeposited coating film simultaneously having high levels of shock resistance (chipping resistance) and corrosion resistance as coating film performance characteristics can be obtained. Therefore, coating films having good appearance, corrosion resistance and shock resistance (chipping resistance) and comparable in these properties to the conventional coating films can be obtained by the so-called three-wet coating comprising applying, onto the electrodeposited coating film obtained from the electrodeposition coating composition of the invention, an intermediate coating and a top coating or, in the case of metallic coating, an intermediate coating, a metallic base coating and a clear coating, in the wet-on-wet manner and simultaneously baking the intermediate coating film and top coating film or the intermediate coating film, metallic base coating film and clear coating film. Furthermore, this three-wet coating makes it possible to construct a novel coating system intended for process curtailment, cost reduction and environmental load reduction.

In coating film formation from the electrodeposition coating composition according to the invention, multilayer electrodeposited films can be obtained with a shock-absorbing layer formed on the electrodeposited layer mainly functioning as corrosion prevention. Therefore, the three-coat films obtained by further applying an intermediate coating and a top coating, in particular those obtained by the so-called three-wet coating comprising applying an intermediate coating and a top coating (in the case of metallic coating, further abase coating and a clear coating) in the wet-on-wet manner and baking the intermediate coating layer and the top coating layer (base coating layer and clear coating layer) simultaneously are excellent in appearance, corrosion resistance and shock resistance (chipping resistance) and are comparable in these properties to the conventional three-coat films. Further, the coating composition mentioned above plays an important role in the coating industry, in particular in the field of automobile coatings, in constructing a novel three-wet coating system for the purpose of curtailing the baking process, reducing the cost and reducing the environmental load (VOC and HAPs).

BEST MODE FOR CARRYING OUT THE INVENTION

The following specific examples illustrate the present invention in detail. They are, however, by no means limitative of the scope of the invention. "Part(s)" and "%" mean "part (s) by weight" and "% by weight", respectively.

Production Example 1
Production of a Blocked Polyisocyanate Curing Agent

A reaction vessel equipped with a stirrer, nitrogen inlet tube, condenser and thermometer was charged with 222 parts of isophoronediisocyanate and, after dilution with 50 parts of methyl isobutyl ketone, 0.2 part of butyltin laurate was added. After raising the temperature to 50° C., 17 parts of methyl ethyl ketoxime was added in a manner such that the temperature of the contents might not exceed 70° C. The mixture was maintained at 70° C. for 1 hour until substantial disappearance of the isocyanato residue-due absorption was confirmed on an infrared absorption spectrum. Dilution with 10 parts of n-butanol gave the desired blocked polyisocyanate (solubility parameter $\delta i=11.8$) with a solid content of 80%.

Production Example 2
Production of a Blocked Polyisocyanate Curing Agent

A reaction vessel equipped with a stirrer, nitrogen inlet tube, condenser and thermometer was charged with 199 parts of hexamethylene diisocyanate trimer and, after dilution with 39 parts of methyl isobutyl ketone, 0.2 part of butyltin laurate was added. After raising the temperature to 50° C., 44 parts of methyl ethyl ketoxime and 87 parts of ethylene glycol mono-2-ethylhexyl ether were added in a manner such that the temperature of the contents might not exceed 70° C. The mixture was maintained at 70° C. for 1 hour until substantial disappearance of the isocyanato residue-due absorption was confirmed on an infrared absorption spectrum. Dilution with 43 parts of n-butanol gave the desired blocked polyisocyanate (solubility parameter $\delta i=10.7$) with a solid content of 80%.

Production Example 3
Production of a Cation-modified Epoxy Resin Emulsion [Particles B]

A reaction vessel equipped with a stirrer, decanter, nitrogen inlet tube, thermometer and dropping funnel was charged with 2,400 parts of a bisphenol A-based epoxy resin (trademark: DER-331J; product of Dow Chemical) with an epoxy equivalent of 188, together with 141 parts of methanol, 168 parts of methyl isobutyl ketone and 0.5 part of dibutyltin dilaurate. The mixture was stirred at 40° C. until uniform dissolution, and 320 parts of 2,4-/2,6-tolylene diisocyanate (80/20 weight ratio mixture) was added dropwise over 30 minutes, whereupon heat was generated and the temperature rose to 70° C. Thereto was added 5 parts of N,N-dimethylbenzylamine, and the system inside temperature was raised to 120° C. and the reaction was allowed to proceed at 120° C. for 3 hours while distilling off the methanol, until the epoxy equivalent reached 500. Further, 644 parts of methyl isobutyl ketone, 341 parts of bisphenol A and 413 parts of 2-ethylhexanoic acid were added and, while maintaining the system inside temperature at 120° C., the reaction was allowed to proceed until the epoxy equivalent reached 1,070, followed by cooling until the system inside temperature lowered to 110° C. Then, a mixture of 241 parts of diethylenetriamine diketimine (methyl isobutyl ketone solution with a solid content of 73%) and 192 parts of N-methylethanolamine was added and the reaction was allowed to proceed at 110° C. for 1 hour to give a cation-modified epoxy resin. This resin had a number average molecular weight of 2,100 and a hydroxyl value of 160. Upon infrared absorption spectroscopy and other measurements, the occurrence of an oxazolidone ring (absorption wave number: 1750 cm$^{-1}$) in the resin was confirmed. The solubility parameter was $\delta b=11.4$.

To the thus-obtained cation-modified epoxy resin were added 1,834 parts of the blocked polyisocyanate curing agent produced in the above Production Example 1 (mixing ratio of the blocked polyisocyanate relative to 100 parts by weight of the cation-modified epoxy resin: 38% by weight), 90 parts of acetic acid and, further, 2 parts of zinc acetate and 2 parts of cerium acetate as rust inhibitors. The mixture was diluted with deionized water to a nonvolatile matter content of 32% and then concentrated under reduced pressure to a nonvolatile matter content of 36%. An aqueous emulsion (hereinafter referred to as E1) comprising the cation-modified epoxy resin as the main component was thus obtained.

Production Example 4
Production of a Cationic Dispersant for Resin (a)

A reaction vessel equipped with a stirrer, condenser, decanter, nitrogen inlet tube and thermometer was charged with 114 parts of methyl isobutyl ketone and, after heating to 50° C., 75 parts of 4,4'-diphenylmethanediisocyanate and 0.1 part of dibutyltin dilaurate as a reaction catalyst were charged and the mixture was heated to and maintained at 50° C. in a nitrogen atmosphere. Further, 110 parts of R-15HT (1,4-polybutadiene-$\alpha,\omega$-diol produced by Idemitsu Petrochemical, number average molecular weight=1,200, hydroxyl value=103) was added dropwise from the dropping funnel over 30 minutes, followed by further 30 minutes of stirring. Then, 24 parts of N-methyldiethanolamine, 20 parts of ethylene glycol mono-2-ethylhexyl ether and 36 parts of a solution of diethylenetriamine diketimine in methyl isobutyl ketone (solid content 73%) were added, and the reaction was allowed to proceed at 80° C. for 30 minutes. Based on substantial disappearance of the absorption of the isocyanato group (wave number: 2220 cm$^{-1}$) on an IR chart for the contents, the reaction was confirmed to be complete. The resin solution obtained had a solid content of 70%, a number average molecular weight of 3,000 and an amine value of 85.

Production Example 5
Production of a Cationic Dispersant for Resin (a)

A reaction vessel equipped with a stirrer, condenser, nitrogen inlet tube, thermometer and dropping funnel was charged with 50 parts of methyl isobutyl ketone, and the contents were heated to and maintained at 115° C. in a nitrogen atmosphere. Further, a mixture composed of 20.2 parts of 2-hydroxyethyl methacrylate, 39.8 parts of 2-ethylhexyl methacrylate, 20 parts of N,N-dimethylaminoethyl methacrylate, 20 parts of styrene and 4.5 parts of V-601 (polymerization initiator produced by Wako Pure Chemical Industries; dimethyl 2,2'-azobis(2-methylpropionate)) was added dropwise from the dropping funnel over 3 hours and, thereafter, 0.5 part of V-601 was further added dropwise. The mixture was maintained at 115° C. for 1.5 hours. The thus-obtained cation-modified acrylic resin had a solid content of 65%, a number average molecular weight of 5,400, an amine value of 71 and a hydroxyl value of 87.

Production Example 6
Production of a Resin Emulsion [Particles A]

A vessel was charged with 70 parts of R-45HT (1,4-polybutadiene-$\alpha,\omega$-diol produced by Idemitsu Petrochemical, number average molecular weight=2,800, hydroxyl value=47, butadiene content=99%, solubility parameter $\delta a=9.5$) as resin (a), 38 parts of the blocked polyisocyanate curing agent solution produced in the above Production Example 2, 40 parts of the cationic dispersant produced in Production Example 4 and 2.5 parts of acetic acid, and the mixture was diluted with deionized water to a nonvolatile matter content of 32% and then concentrated under reduced pressure to a nonvolatile matter content of 36%. An aqueous emulsion (hereinafter referred to as E2) comprising the cation-modified resin as a main component was thus obtained.

Production Example 7
Production of a Resin Emulsion [Particles A]

A vessel was charged with 350 parts of a solution of Clayton D-1107 (polystyrene-polyisoprene-polystyrene block copolymer produced by Clayton Polymer Japan, isoprene content=84%, estimated number average molecular weight=140,000, solubility parameter $\delta a=9.2$) as resin (a) in methyl isobutyl ketone (solid matter concentration 20%), 10 parts of the blocked polyisocyanate curing agent solution produced in the above Production Example 2, 30 parts of the cationic dispersant solution produced in Production Example 5 and 2.5 parts of acetic acid, and the mixture was diluted with deionized water to a nonvolatile matter content of 32% and then concentrated under reduced pressure to a nonvolatile matter content of 36%. An aqueous emulsion (hereinafter referred to as E3) comprising the cation-modified resin as a main component was thus obtained.

Production Example 8
Production of a Resin Emulsion [Particles A]

A vessel was charged with 350 parts of a solution of TR-2600 (polystyrene-polybutadiene-polystyrene block copolymer produced by JSR, butadiene content=68%, estimated number average molecular weight=150,000, solubility parameter $\delta a=9.2$) as resin (a) in methyl isobutyl ketone (solid matter concentration 20%), 40 parts of the cationic dispersant solution produced in Production Example 4 and 2.5 parts of acetic acid, and the mixture was diluted with deionized water to a nonvolatile matter content of 32% and then concentrated under reduced pressure to a nonvolatile matter content of 36%. An aqueous emulsion (hereinafter referred to as E4) comprising the cation-modified resin as a main component was thus obtained.

Production Example 9
Production of a Pigment-dispersing Resin

A reaction vessel equipped with a stirrer, condenser, nitrogen inlet tube and thermometer was charged with 710 parts of a bisphenol A-based epoxy resin (trademark: Epon 829, product of Shell Chemical) with an epoxy equivalent of 198 and 289.6 parts of bisphenol A, and the reaction was allowed to proceed at 150 to 160° C. for 1 hour in a nitrogen atmosphere. Then, after cooling to 120° C., 406.4 parts of a solution of tolylene diisocyanate half-blocked with 2-ethylhexanol in methyl isobutyl ketone (solid content 95%) was added. The reaction mixture was maintained at 110 to 120° C. for 1 hour and then 1,584.1 parts of ethylene glycol mono-n-butyl ether was added. The mixture was cooled to 85 to 95° C. and homogenized.

In parallel to the production of the above reaction product, a separate reaction vessel was charged with 384 parts of a solution of tolylene diisocyanate half-blocked with 2-ethylhexanol in methyl isobutyl ketone (solid content 95%) and 104.6 parts of dimethylethanolamine, and the mixture was stirred at 80° C. for 1 hour. Then, 141.1 parts of a 75% aqueous solution of lactic acid was added, 47.0 parts of ethylene glycol mono-n-butyl ether was further mixed in and the mixture was stirred for 30 minutes to give a quaternizing agent (solid content 85%). The thus-produced quaternizing agent (620.46 parts) was added to the above reaction product, and the mixture was maintained at 85 to 95° C. until the acid value amounted to 1. A pigment-dispersing resin varnish (resin solid content 56%, average molecular weight 2,200) was thus obtained.

Production Example 10
Production of a Pigment Dispersion Paste

Using a sand mill, a pigment paste (hereinafter referred to as P1) was prepared according to the following formulation including the pigment-dispersing resin obtained in Production Example 9.
Pigment-dispersing Resin Varnish of Production Example 9

| | |
|---|---|
| Pigment-dispersing resin varnish of Production Example 9 | 53.6 parts |
| Titanium dioxide | 88.0 parts |
| Carbon black | 2.0 parts |
| Aluminum phosphomolybdate | 10.0 parts |

Comparative Production Example 1
Production of an Epoxidized Polystyrene-polybutadiene-polystyrene Block Copolymer To 150 parts of a solution of TR-2600 (polystyrene-polybutadiene-polystyrene block copolymer produced by JSR, butadiene content 68%, estimated number average molecular weight=150,000) in ethyl acetate (solid matter concentration 20%) placed in a reaction vessel equipped with a stirrer, condenser, nitrogen inlet tube and thermometer was continuously added dropwise 20 parts of a 30% (by weight) solution of peracetic acid in ethyl acetate and, after completion of this dripping, the mixture was stirred at 40° C. for 3 hours to effect epoxidation. Thus was obtained an epoxidized polystyrene-polybutadiene-polystyrene block copolymer solution with epoxy equivalent of 500 (solubility parameter $\delta a=10.6$).

Then, 1,000 parts of the above resin solution (solid matter concentration 22%), 250 parts of the blocked polyisocyanate curing agent solution produced in the above Production Example 1, 20 parts of acetic acid and, further, 0.6 part of zinc acetate and 0.6 part of cerium acetate as rust inhibitors were added to 1,030 parts of the cation-modified epoxy resin solution (solid matter concentration 81%) before emulsification as obtained in Production Example 3. The mixture was diluted with deionized water to a nonvolatile matter content of 32% and then concentrated under reduced pressure to a nonvolatile matter content of 36% to give an aqueous emulsion (hereinafter referred to as E5) with the epoxidized polystyrene-polybutadiene-polystyrene block copolymer enclosed by the cation-modified epoxy resin.

Comparative Production Example 2
Production of a Copolymer Resulting from Integration of a Diene-based Resin With an Epoxy Resin A reaction vessel equipped with a stirrer, condenser, nitrogen inlet tube and thermometer was charged with 400 parts of PP-300 (polypropylene glycol diglycidyl ether produced by Sanyo Chemical Industries, epoxy equivalent=300), 435 parts of bisphenol A and 4 parts of triphenylphosphine, and the reaction was allowed to proceed with stirring at 150° C. for 3 hours. The disappearance of the epoxy group was confirmed by IR analysis. Thereafter, the temperature was lowered to 110° C. and 869 parts of ELA-128 (liquid epoxy resin produced by Sumitomo Chemical, epoxy equivalent=186), 296 parts of Hycar CTBN1300-13 (carboxyl-terminated butadiene-acrylonitrile copolymer produced by Goodrich, molecular weight=3,200, butadiene content=83%) and 218 parts of toluene were added. While maintaining the temperature at 120° C., the reaction was further allowed to proceed, whereby an epoxy resin composition with an epoxy equivalent of 1,000 was synthesized.

The temperature was lowered to 100° C. and 975 parts of propylene glycol monomethyl ether was added. Further, 140 parts of diethanolamine was added and the reaction was allowed to proceed with stirring at 100° C. for 3 hours. The thus-finished resin solution had a solid matter concentration of 64% and an amine value of 48. The butadiene content in the resin composition was 12%. To this resin solution were added 250 parts of the blocked polyisocyanate curing agent solution produced in the above Production Example 1, 20 parts of acetic acid and, further, 1.2 parts of zinc acetate and 1.2 parts of cerium acetate as rust inhibitors. The mixture was diluted with deionized water to a nonvolatile matter content of 32% and then concentrated under reduced pressure to a nonvolatile matter content of 36% to give an aqueous emulsion (hereinafter referred to as E6) of the copolymer resulting from integration of the diene-based resin and epoxy resin.

EXAMPLES 1 TO 3

Water-borne coating compositions (each with a solid matter concentration of 20%) were prepared using the cation-modified epoxy resin emulsion [particles B] (E1) obtained in Production Example 3, the resin emulsions [particles A] (E2 to E4) obtained in Production Examples 6 to 8, the pigment dispersion paste (P1) obtained in Production Example 10 and deionized water.

In the above coatings, an emulsion paste of dibutyltin oxide as a curing catalyst was incorporated in an amount of 1.5% as tin amount relative to the total amount of solids in each coating. The combinations of each materials, the mixing ratios (resin solids ratios, without including the curing agent weight in calculation) and the pigment/resin vehicle (total vehicle weight, including the curing agent weight) ratio (P/V) were as shown below in Table 1. In each table, δa denotes the solubility parameter of the above resin (a), δb the solubility parameter of the above resin (b) and δi the solubility parameter of the blocked polyisocyanate.

Comparative Examples 1 and 2

Using the resin emulsions (E5 and E6) obtained in Comparative Production Example 1 and Comparative Production Example 2, water-borne coating compositions (each with the same solid matter concentration as in Examples) were prepared in the same manner as in Examples.

TABLE 1

| | Example | | | Compar. Ex. | |
|---|---|---|---|---|---|
| | 1 | 2 | 3 | 1 | 2 |
| Emulsion of particles B | E1 | E1 | E1 | E5 | E6 |
| Emulsion of particles A | E2 | E3 | E4 | | |
| Resin mixing ratio resin (a)/resin (b) | 50/50 | 30/70 | 20/80 | 20/80 | — |
| δa | 9.5 | 9.2 | 9.2 | 10.6 | — |
| δb | 11.4 | 11.4 | 11.4 | 11.4 | — |
| δb-δa | 1.9 | 2.2 | 2.2 | 0.8 | — |
| δi | 10.7 | 10.7 | — | — | — |
| | 11.8 | 11.8 | 11.8 | 11.8 | 11.8 |
| P/V | 1/4 | 1/4 | 1/3.5 | 1/3.5 | 1/4 |

The water-borne coating compositions prepared according to the above formulations for Examples and Comparative Examples were applied, by electrodeposition, to zinc phosphate-treated steel panels at a voltage such that an electrodeposited coating film thickness of 30 μm was obtained after baking, followed by 5 minutes of preheating at 100° C. and further by 15 minutes of baking at 160° C. The results of evaluation of the respectively obtained electrodeposited coating films for their properties and performance characteristics are shown in Table 2.

In Table 2, the layer directly contacting air is referred to as "upper layer" and the layer directly contacting the conductive substrate as "lower layer" for convenience' sake.

Evaluation Methods (1) Stability of the Coating

The water-borne coating composition was maintained at 30° C. and stirred for 1 month. Thereafter, one liter thereof was filtered through 400-mesh wire gauze. The residual solid matter on the wire gauze weighed less than 5 mg, the stability was judged as good.

(2) Layer Separation in the Electrodeposited Coating Film

The section was visually observed using a video microscope. In case a multilayer electrodeposited film was found, the main resin constituting each layer was identified by FTIR-ATR analysis.

(3) Thickness of Each Layer

The thickness was measured based on the results of the cross-section observation using the video microscope mentioned above.

(4) Elongation Percentage of the Upper Layer-forming Resin

Specimens for tensile testing were separately prepared according to JIS K 6301 using the resin (a)-containing emulsions E2 to E4 and measured. The curing conditions were the same as the coat curing conditions mentioned above.

(5) Tg (Dynamic Glass Transition Temperature) of the Upper Layer and of the Lower Layer A multilayer electrodeposited film formed on a tin panel was peeled off using mercury and cut to prepare specimens for measurements. The specimens were once frozen using liquid nitrogen on a Rheometrics dynamic analyzer RDA-II tester (product of Rheometrics, USA) and then given vibrations with a frequency of 10 Hz at a rate of temperature rising of 2° C. per minute and measured for viscoelasticity. The ratio (tanδ) of the loss elastic modulus (E") relative to the storage elastic modulus (E') was calculated and each dynamic Tg was determined by determining the point of inflexion thereof.

(6) Electrodeposited Film Surface Roughness

The coated panel obtained was measured for surface roughness Ra according to JIS B 0601 using Handy Surf E-30A (product of Tokyo Seimitsu) (cutoff 0.8 mm).

(7) SDT

The coated panel was given cross cuts reaching the substrate by means of a knife and subjected to salt solution immersion testing (5% aqueous solution of sodium chloride, 55° C.) for 240 hours and peeling was attempted from both sides of the cut area using an adhesive tape. The maximum width of the portion peeled off was indicated.

(8) SST

The coated panel was given cross cuts reaching the substrate by means of a knife and subjected to salt spray testing (5% aqueous solution of sodium chloride) for 240 hours. The maximum width of rust generated from the cross-cut portion was indicated.

(9) Shock Resistance

Using a DuPont impact tester, a weight of 1 kg was allowed to fall upon the panel from a height of 50 cm at room temperature and the panel was examined for coating film breaking and peeling.

(10) Chipping Resistance

No. 7 crushed basalt stones (2.4 to 4.8 mm in size) weighing 100 g were shot at a shooting-out pressure of 0.3 kgf/cm$^2$ at the coated panel cooled to −20° C. so that they might collide with the panel in the direction perpendicular thereto. The extent of damage against the coating film was then examined.

TABLE 2

| Test item | Example 1 | Example 2 | Example 3 | Compar. Ex. 1 | Compar. Ex. 2 |
|---|---|---|---|---|---|
| Stability of the coating | Good | Good | Good | Good | Good |
| Electrodeposited film section observation | Separation into two layers | Separation into two layers | Separation into two layers | Single-layer structure | Single-layer structure |
| Layer thickness A ($\mu$m) | 15 | 10 | 5 | — | — |
| Layer thickness B ($\mu$m) | 15 | 15 | 25 | — | — |
| Elongation (%) of upper layer-forming resin | 800 | 1500 | 1030 | — | — |
| Tg (° C.) of upper layer | −50 | −60 | −80 | — | — |
| Tg (° C.) of lower layer | 90 | 90 | 90 | — | — |
| Electrodeposited film surface roughness Ra | 0.15 | 0.15 | 0.18 | 0.20 | 0.25 |
| SDT | 0.1 mm | 0.1 mm | 0.1 mm | 3 mm | 6 mm |
| SST | 1.0 mm | 1.0 mm | 1.5 mm | 4 mm | 8 mm |
| Shock resistance | No breaking, no peeling | No breaking, no peeling | No breaking, no peeling | Breaking and peeling | Breaking and peeling |
| Chipping resistance | No film chipping from substrate | No film chipping from substrate | No film chipping from substrate | Chipping | Chipping |

The results of Examples and Comparative Examples clearly indicate that the water-borne coating compositions produced in Examples according to the present invention have good coating stability and, when applied, can form multilayer electrodeposited coating films excellent in surface smoothness, corrosion resistance and shock resistance (chipping resistance).

What is claimed is:

1. An electrodeposition coating composition comprising a particle A containing a resin (a) whose solubility parameter is δa as well as a particle B containing a curing agent and a resin (b) whose solubility parameter is δb, wherein (1) the value of (δb−δa) is not less than 1.0,
   (2) as regards an electrodeposited coating film formed from said electrodeposition coating composition, the resin film formed from said particle A shows a dynamic glass transition temperature of −110 to 10°C.,
   the resin film obtained by film formation from said particle A alone shows an elongation percentage of not less than 200%, and
   the resin film formed from said particle B shows a dynamic glass transition temperature of 60 to 150°C., and
   (3) the particle A contains a curing agent and a solubility parameter δi of at least one of said curing agent satisfies δb>δi>δa.

2. The electrodeposition coating composition according to claim 1, wherein the weight ratio between the resin (a) and the resin (b) on the solid basis is 5/95 to 70/30.

3. The electrodeposition coating composition according to claim 1, wherein the resin (a) is obtained by polymerization of a monomer component comprising at least 50% by weight of a conjugated diene monomer.

4. The electrodeposition coating composition according to claim 1, wherein the resin (b) is a cation-modified epoxy resin.

5. The electrodeposition coating composition according to claim 1, wherein the particle A and/or the particle B contain a cationic emulsifier.

* * * * *